US009834255B2

(12) United States Patent
Chung et al.

(10) Patent No.: US 9,834,255 B2
(45) Date of Patent: Dec. 5, 2017

(54) FLOOR BODY FOR VEHICLE

(71) Applicants: Hyundai Motor Company, Seoul (KR); Kia Motors Corp., Seoul (KR)

(72) Inventors: Hee Seouk Chung, Hwaseong-si (KR); Deok Hwa Hong, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/936,344

(22) Filed: Nov. 9, 2015

(65) Prior Publication Data
US 2017/0015364 A1   Jan. 19, 2017

(30) Foreign Application Priority Data

Jul. 15, 2015   (KR) .................. 10-2015-0100320

(51) Int. Cl.
*B62D 25/20* (2006.01)
*B62D 21/15* (2006.01)

(52) U.S. Cl.
CPC ............ *B62D 25/20* (2013.01); *B62D 21/157* (2013.01)

(58) Field of Classification Search
CPC ........ B62D 21/00; B62D 21/02; B62D 21/03; B62D 21/15; B62D 21/157; B62D 25/025; B62D 25/20; B62D 25/2036
See application file for complete search history.

(56) References Cited

U.S. PATENT DOCUMENTS

| 5,921,618 A * | 7/1999 | Mori ................... B62D 21/157 296/187.12 |
| 6,279,990 B1 * | 8/2001 | Miyasaka ............ B62D 25/025 296/193.06 |
| 6,428,085 B1 * | 8/2002 | Miyasaka ............ B60N 2/0715 296/187.12 |
| 6,540,286 B2 * | 4/2003 | Takemoto .............. B60N 2/012 296/204 |
| 7,014,256 B2 * | 3/2006 | Kamura ............ B62D 25/2036 296/1.03 |

(Continued)

FOREIGN PATENT DOCUMENTS

| DE | 102008033810 A1 * | 3/2009 | .......... B62D 21/157 |
| DE | 102007056644 A1 * | 5/2009 | .......... B62D 25/025 |

(Continued)

Primary Examiner — Glenn Dayoan
Assistant Examiner — Paul Chenevert
(74) Attorney, Agent, or Firm — Morgan, Lewis & Bockius LLP

(57) ABSTRACT

A floor body for a vehicle may include a floor panel forming a lower portion of a vehicle, side sill members extending in a length direction of the vehicle and coupled to both sides of the floor panel, a center side area being a virtual area with a shape extending in a length direction on the floor panel and passing through a point at which a center side member extending in the length direction of the vehicle from both sides of a central portion of the floor panel is provided, and a cross member disposed on the floor panel and extending in a width direction of the vehicle to pass through the center side area and formed so that a portion of the cross member positioned outside the center side area is thicker than that of a portion of the cross member positioned in the center side area.

6 Claims, 3 Drawing Sheets

(56) References Cited

U.S. PATENT DOCUMENTS

| | | | | |
|---|---|---|---|---|
| 7,147,272 | B2* | 12/2006 | Odaka | B62D 21/157 296/187.12 |
| 7,500,714 | B2* | 3/2009 | Abe | B62D 21/157 296/187.09 |
| 7,644,978 | B2* | 1/2010 | Tosaka | B62D 21/157 296/187.08 |
| 7,854,472 | B2* | 12/2010 | Gomi | B62D 25/20 296/193.07 |
| 8,052,205 | B2* | 11/2011 | Matsuyama | B62D 25/20 296/193.07 |
| 8,292,356 | B2* | 10/2012 | Ishigame | B62D 21/157 296/193.05 |
| 9,592,853 | B2* | 3/2017 | Aitharaju et al. | B62D 29/04 |
| 9,650,003 | B2* | 5/2017 | Owens | B60R 19/023 |
| 2002/0145307 | A1* | 10/2002 | Fujita | B62D 25/20 296/193.07 |
| 2008/0252104 | A1 | 10/2008 | Yamaguchi et al. | |
| 2014/0306485 | A1* | 10/2014 | Bechtler | B62D 25/20 296/187.08 |
| 2015/0108793 | A1* | 4/2015 | Peschansky | B62D 29/041 296/204 |
| 2016/0001816 | A1* | 1/2016 | Aitharaju | B62D 21/15 296/187.03 |
| 2017/0144711 | A1* | 5/2017 | Daigaku | B62D 21/02 |

FOREIGN PATENT DOCUMENTS

| | | | | |
|---|---|---|---|---|
| DE | 102007056645 | A1 * | 5/2009 | B21D 53/88 |
| DE | 102009053396 | A1 * | 6/2010 | B62D 21/15 |
| DE | 102009015355 | A1 * | 9/2010 | B62D 25/20 |
| FR | WO 2007088303 | A1 * | 8/2007 | B60N 2/015 |
| JP | 3343709 | A1 * | 6/1984 | B21D 5/08 |
| JP | 11-291955 | A | 10/1999 | |
| JP | 2001-247058 | A | 9/2001 | |
| JP | 2005-297610 | A | 10/2005 | |
| JP | 2009-40102 | A | 2/2009 | |
| JP | 2013-107470 | A | 6/2013 | |
| JP | 2014-108760 | A | 6/2014 | |
| KR | 10-0998455 | B1 | 11/2010 | |

* cited by examiner

FLOOR BODY FOR VEHICLE

CROSS REFERENCE TO RELATED APPLICATION

The present application claims priority to Korean Patent Application No. 10-2015-0100320, filed Jul. 15, 2015, the entire contents of which is incorporated herein for all purposes by this reference.

BACKGROUND OF THE INVENTION

Field of the Invention

The present invention relates to a floor body for a vehicle capable of promoting a weight reduction of a vehicle body and efficiently improving required safety upon vehicle crashes.

Description of Related Art

Generally, a floor body for a vehicle forming a lower portion of a vehicle needs to be designed to prevent a vehicle body from being damaged and deformed due to a shock and a load applied to the lower portion of the vehicle body which may be generated under crash situations, thereby safely protecting passengers in the vehicle.

Therefore, in the typical floor body for a vehicle, members, etc., configuring the floor body are designed and a coupling relation between the members is formed in consideration of a size and a direction of the shock generated upon vehicle crashes to prevent the vehicle body from being damaged and deformed due to the outside shock, thereby improving the safety of the passengers in the vehicle.

In the typical floor body for a vehicle, the number of members forming the lower portion of the vehicle body is increased, a thickness of the member is increased, or the like, to prevent the vehicle body from being damaged due to the strong shock. As a result, the entire weight of the vehicle is inevitably increased and therefore problems such as degradation in driving fuel efficiency and reduction in driving performance involved in the weight increase of the vehicle may occur.

To solve the aforementioned problems by the improvement in safety of the vehicle body and the weight reduction of the vehicle, the currently used lower structure of the vehicle body has a reinforcing member locally added to a portion where strength reinforcement is required to increase safety against the shock applied to the outside of the vehicle and promote the weight reduction in the vehicle body. In addition, many businesses have continuously tried to improve the safety of the vehicle and promote the weight reduction in the vehicle.

However, in the prior art, the floor body for a vehicle described above, adding the reinforcing member to the portion where the strength reinforcement is required makes the configuration of the vehicle body unnecessarily complicated to cause inconvenience of a design for the floor body, manufacturing and assembling the reinforcing member cause an increase in costs to reduce economical efficiency, and coupling the reinforcing member is performed by spot welding which is not helpful in substantially increasing strength.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a floor body for a vehicle capable of promoting a weight reduction of a vehicle body and efficiently improving required safety upon vehicle crashes.

According to various aspects of the present invention, a floor body for a vehicle may include a floor panel forming a lower portion of a vehicle, side sill members extending in a length direction of the vehicle and coupled to both sides of the floor panel, a center side area being a virtual area with a shape extending in a length direction on the floor panel and passing through a point at which a center side member extending in the length direction of the vehicle from both sides of a central portion of the floor panel is provided, and a cross member disposed on the floor panel and extending in a width direction of the vehicle to pass through the center side area and formed so that a portion of the cross member positioned outside the center side area is thicker than that of a portion of the cross member positioned in the center side area.

The floor body for the vehicle may further include a reinforcing area being a virtual area with a shape extending in the length direction on the floor panel and passing through a point between the center side member and the side sill member, in which the cross member may be formed so that a portion of the cross member positioned in the reinforcing area is thicker than that of a portion of the cross member positioned outside of the reinforcing area.

The floor body for the vehicle may further include an outer mounting area being a virtual area with a shape extending in the length direction on the floor panel and passing through a point at which a sheet outer mounting coupled with a lower portion of a sheet of the vehicle between the side sill member and the center side member is provided, in which the cross member may be formed so that a portion of the cross member positioned in a reinforcing area other than the outer mounting area is thicker than that of a portion of the cross member positioned in the outer mounting area.

The floor body for the vehicle may further include a sheet protecting area being a virtual area with a shape extending in the length direction on the floor panel and passing through a point between the outer mounting area and the center side area, in which the cross member may be formed so that a portion of the cross member positioned in the sheet protecting area is thicker than that of a portion positioned of the cross member outside of the sheet protecting area.

The floor body for the vehicle may further include a central area being a virtual area with a shape extending in the length direction on the floor panel and passing through a point between the center side members provided at both sides of a central portion of the floor panel, and a tunnel area being the virtual area with a shape extending in the length direction on the floor panel and passing through a tunnel part extending in the length direction of the vehicle from the central portion of the floor panel, in which the cross member may be formed so that a portion of the cross member positioned in the central area other than the tunnel area is thicker than that of a portion of the cross member positioned in the tunnel area.

The floor body for the vehicle may further include an inner mounting area being a virtual area with a shape extending in the length direction on the floor panel and set to pass through a point at which a sheet inner mounting coupled with the lower portion of the sheet of the vehicle between the center side member and the tunnel part is provided, in which the cross member may be formed so that a portion of the cross member positioned in the inner mounting area other than the tunnel area is thicker than that of a portion of the cross member positioned in the central area other than the inner mounting area.

The central portion of the side sill member may be thicker than that of both ends thereof.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
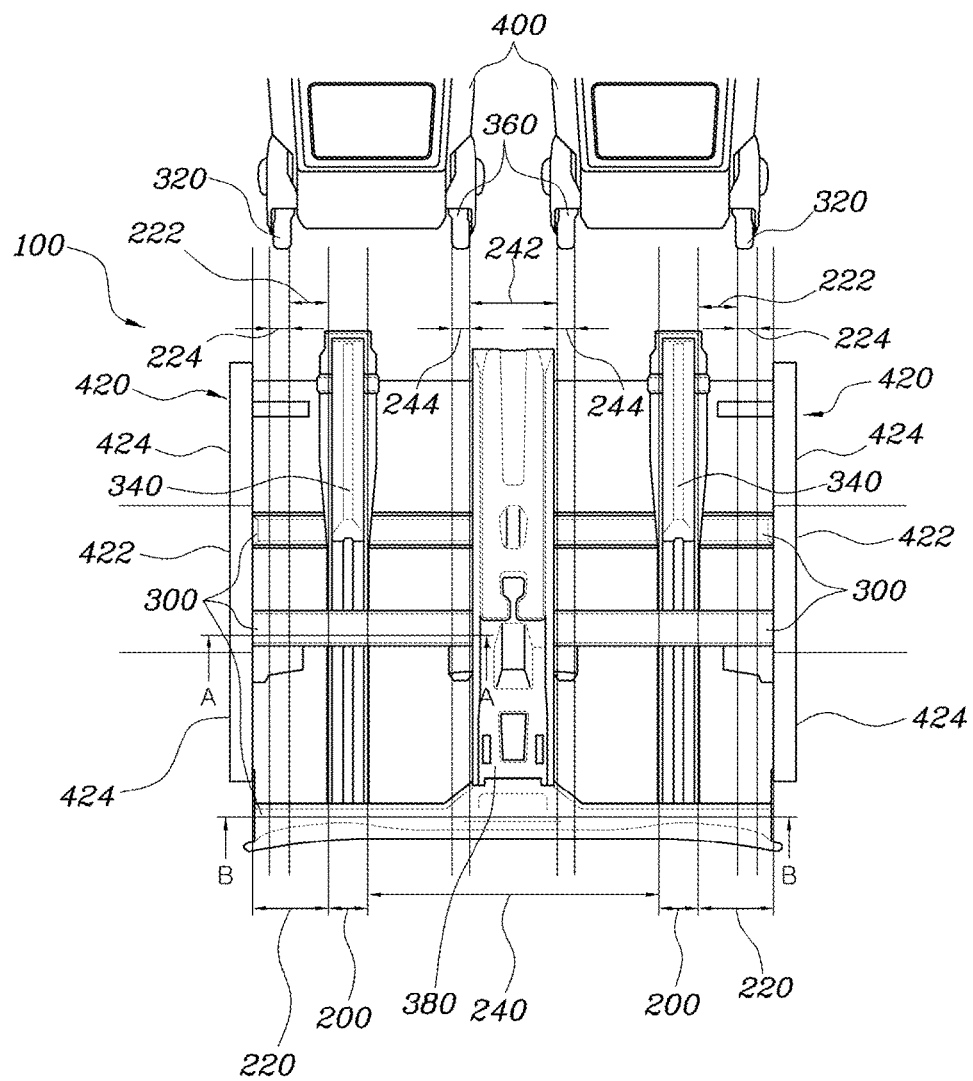
FIG. 1 is a diagram illustrating an exemplary floor body for a vehicle according to the present invention.
Figure 2:
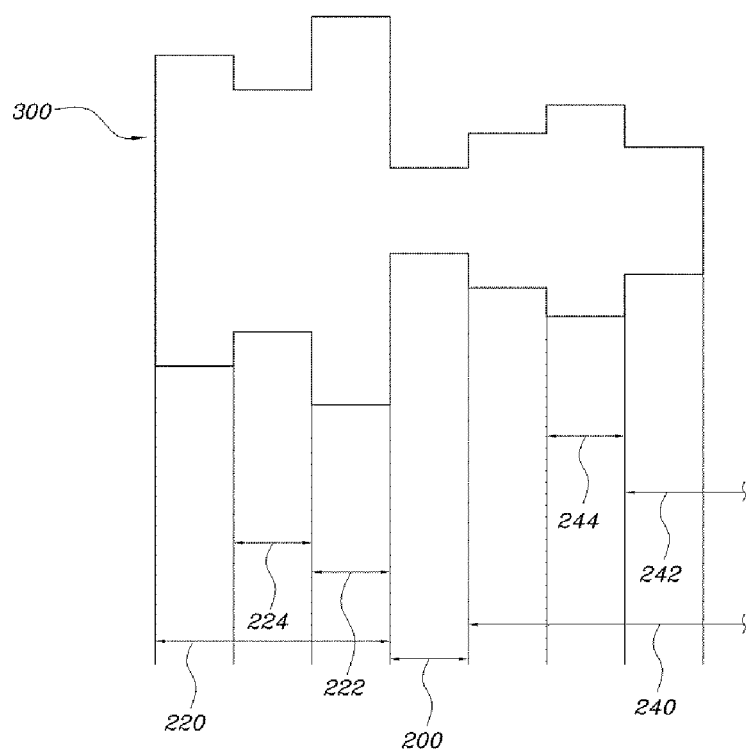
FIG. 2 is a schematic diagram illustrating a change in thickness of a sheet cross member forming the exemplary floor body for a vehicle according to the present invention.
Figure 3:
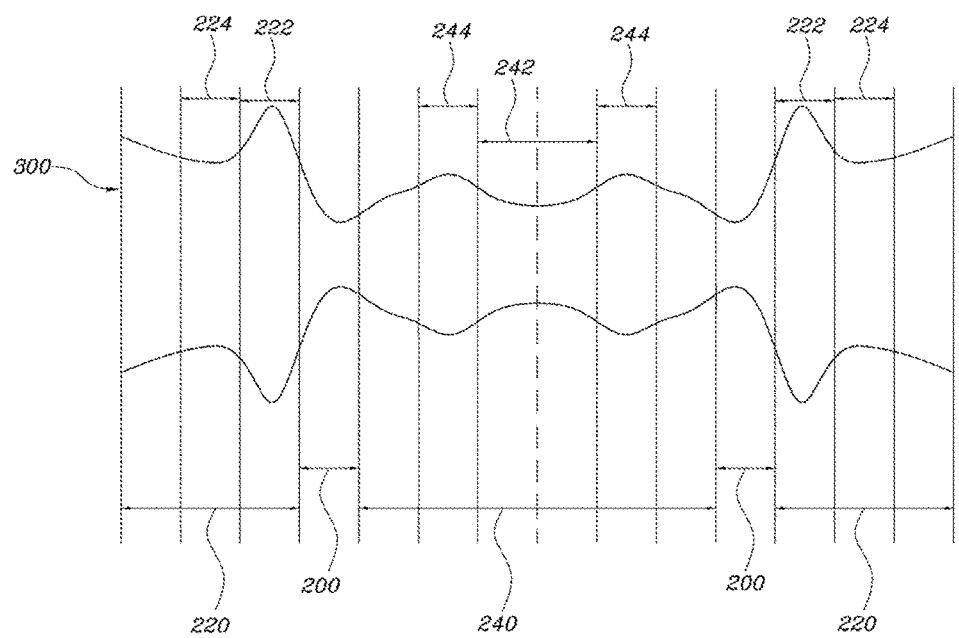
FIG. 3 is a schematic diagram illustrating a schematic diagrams illustrating the change of the strength of cross members according to the present invention.

FIG. 1 is a diagram illustrating a floor body 100 for a vehicle according to various embodiments of the present invention, FIG. 2 is a schematic diagram illustrating a change in thickness of a sheet cross member forming the floor body 100 for the vehicle according to various embodiments of the present invention, and FIG. 3 is a schematic diagram illustrating a schematic diagrams illustrating the change of the strength of cross members according to various embodiments of the present invention.

The present invention may promote the weight reduction of the floor body 100 for the vehicle and efficiently improve the required safety upon vehicle crashes.

As illustrated in FIG. 1, a floor body 100 for a vehicle includes a floor panel configuring a lower portion of a vehicle, side sill members 420 extending in a length direction of the vehicle and coupled with both sides of the floor panel, a center side area 200 being a virtual area set in a shape extending in a length direction on the floor panel and set to pass through a point at which a center side member 340 extending in a length direction of the vehicle from both sides of a central portion of the floor panel is provided, and a cross member 300 installed on the floor panel and extending in a width direction of the vehicle to pass through the center side area 200 and formed so that a portion positioned outside the center side area 200 has thickness thicker than a portion positioned in the center side area 200.

Describing this in detail, the floor panel forms the lower portion of the vehicle. FIG. 1 illustrates the floor panel provided at the lower of the vehicle.

The floor panel forms a lower surface of a vehicle body and supports a load of the vehicle body. The floor panel is a base coupled with various members forming the lower portion of the vehicle body and a central portion thereof is preferably provided with a tunnel part 380 extending in a length direction of the vehicle.

Further, the side sill members 420 extend in a length direction of the vehicle and are coupled with both sides of the floor panel. FIG. 1 illustrates the side sill member 420 coupled with both sides of the floor panel.

The side sill members 420 are coupled with both sides at the lower portion of the vehicle body to support the load of the vehicle body, in particular, serves to support a load such as a pillar member formed at a door side and to primarily absorb and share load of impact of the side crashes of a vehicle.

Meanwhile, the center side area 200 is a virtual area set in a shape extending in a length direction on the floor panel and is set to pass through a point at which a center side member 340 extending in a length direction of the vehicle from both sides of a central portion of the floor panel is provided.

The center side member 340 is provided in the length direction of the vehicle between the central portion of the floor panel and the side sill member 420 to share a load transferred in the length direction of the floor panel. Further, the center side member 340 forms a coupling relation between members forming the lower portion of the vehicle body such as the floor panel to serve to disperse the load.

The center side area 200 is set on the floor panel and extends in the length direction of the vehicle. This may be formed only at a portion in the length direction of the vehicle, and preferably, set over the whole length of the floor panel.

Further, the cross member 300 is mounted on the floor panel and extends in a width direction of the vehicle to pass through the center side area 200 and a portion outside the center side area 200 is thicker than a portion positioned in the center side area 200.

Generally, the cross member 300 represents a member extending in the width direction of the vehicle from the lower portion of the vehicle body. FIG. 1 illustrates, as an example of the cross member 300 forming the floor body 100, an interim cross member positioned at a back portion of the vehicle and a sheet cross member symmetrically provided at both sides of the floor panel and having a sheet seated at an upper portion thereof.

The cross member extends in the width direction of the vehicle to be coupled with the floor panel and extends in the length direction of the vehicle to pass through the center side area 200 set to correspond to the whole length of the floor panel.

Meanwhile, the cross member 300 shares a crash transferred in the width direction of the vehicle upon side crashes of the vehicle and therefore needs to satisfy strength required to prevent the vehicle body from being damaged due to the crashes.

However, the strength of the portion of the cross member 300 positioned in the center side area 200 may be reinforced by the center side member 340. As a result, when the whole of the cross member 300 is molded at the same thickness, the strength of the center side area 200 is unnecessarily strong, which is inefficient.

Therefore, the cross member 300 is molded to make a portion in the center side area 200 having the reinforcing relation on a coupled position with the center side member 340 thinner, such that unnecessary consumption of materials forming the reinforcing member and the cross member 300 is reduced to reduce a weight of the vehicle body and efficiently form the strength, thereby promoting safety of the vehicle body.

The cross member 300 may be formed by a Trailer Rolled Blank (TRB) mechanism for reducing the thickness of the portion corresponding to the center side area 200 using a rolling process and integrally molding the cross member 300, but the cross member 300 may be molded by various mechanisms such as Trailer Welded Blank (TWB) mechanism for individually molding portions with a reduced thickness and then integrating the molded parts with other portions using laser welding.

FIG. 2 schematically illustrates that a portion positioned within the center side area 200 in the cross member 300 according to various embodiments of the present invention is thinner than other portions.

Meanwhile, as illustrated in FIG. 1, the floor body 100 for a vehicle according to various embodiments of the present invention further includes a reinforcing area 220 being the virtual area set in the shape extending in the length direction on the floor panel and set to pass through a point between the center side member 340 and the side sill member 420, in which the cross member 300 is formed so that a portion positioned in the reinforcing area 220 may be thicker than that of a portion positioned outside of the reinforcing area 220.

The cross member 300 is provided in a width direction of the vehicle, in which a strong shock is applied from side portions of the vehicle body upon side crashes of the vehicle and a shock is transferred to a central portion of the vehicle body through each member forming the lower portion of the vehicle body.

Therefore, the reinforcing area 220 is the virtual area corresponding to both sides of the floor panel set between the center side member 340 and the side sill member 420 to define both sides of the floor panel relatively sharing the stronger shock than that of the central portion of the floor panel.

Therefore, the cross member 300 is molded so that the portion positioned in the reinforcing area 220 is thicker than the central area 240 of the floor panel positioned outside the reinforcing area 220 to prevent the vehicle body from being damaged due to the shock generated upon on the side crashes of the vehicle, thereby efficiently increasing the safety of the vehicle.

FIG. 2 schematically illustrates that the portion positioned within the reinforcing area 220 in the cross member 300 according to various embodiments of the present invention is thicker than other portions.

Meanwhile, as illustrated in FIG. 1, the floor body 100 for a vehicle according to various embodiments of the present invention further includes an outer mounting area 224 being the virtual area set in the shape extending in the length direction on the floor panel and set to pass through a point at which a sheet outer mounting 320 coupled with a lower portion of a sheet 400 of the vehicle between the side sill member 420 and the center side member 340 is provided, in which the cross member 300 is formed so that a portion positioned in the reinforcing area 220 other than the outer mounting area 224 may be thicker than that of a portion positioned in the outer mounting area 224.

Preferably, a sheet mounting supporting a load of a passenger and connecting between the sheet 400 and the vehicle body is coupled with a lower surface of the sheet 400 of the vehicle. Preferably, a pair of sheet mountings is provided at the left and the right of the sheet 400 in a shape extending in the length direction of the vehicle.

The pair of sheet mountings is divided into a sheet inner mounting 360 provided inside the vehicle and a sheet outer mounting 320 provided outside the vehicle. Here, FIG. 1 illustrates a position relation of the sheet mounting.

Meanwhile, the sheet outer mounting 320 is positioned in the reinforcing area 220 and serves as a reinforcing body for a portion of the cross member 300 positioned at the lower portion thereof. Therefore, a portion of the cross member 300 at the point at which the sheet outer mounting 320 is positioned has strength larger than that of other portions.

Therefore, the outer mounting area 224 which is the virtual area set in the shape extending in the length direction on the floor panel is set to pass through the point at which the sheet outer mounting 320 is positioned and a thickness of a portion of the cross member 300 corresponding to the outer mounting area 224 is controlled.

That is, the cross member 300 is molded to make the portion positioned in the reinforcing area 220 other than the outer mounting area 224 thicker than the portion positioned in the outer mounting area 224, such that the portion positioned in the outer mounting area 224 may be relatively more thinly molded.

Consequently, by removing the unnecessary increase in strength of the outer mounting area 224, the required strength of each portion of the vehicle body is satisfied to secure the safety and the unnecessary consumption of materials of the outer mounting area 224 is reduced to promote the weight reduction of the vehicle body.

Meanwhile, as illustrated in FIG. 1, the floor body 100 for a vehicle according to various embodiments of the present invention further includes a sheet protecting area 222 being the virtual area set in the shape extending in the length direction on the floor panel and set to pass through a point between the outer mounting area 224 and the center side area 200, in which the cross member 300 is formed so that a portion positioned in the sheet protecting area 222 may be thicker than that of a portion positioned outside of the sheet protecting area 222.

The sheet protecting area 222 is set at the lower portion of the sheet 400 and is set at a position at which the sheet mounting, the center side member 340, etc., is not provided. The sheet protecting area 222 is an area in which other coupling members are not positioned while being positioned in the reinforcing area 220 applied with the strong shock upon the side crashes of the vehicle body and requires the strong strength.

That is, the sheet protecting area 222 applied with the strong shock upon the side crashes of the vehicle is at a position directly associated with safety of a passenger when the sheet protecting area 222 is deformed and is formed to have strong strength, thereby safely protecting a passenger.

Therefore, the sheet protecting area 222 is set between the outer mounting area 224 and the center side area 200 and the cross member 300 is formed at a high strength by making the portion positioned in the sheet protecting area 222 thicker than other portions.

FIG. 2 schematically illustrates a difference in thickness between a portion of the cross member 300 positioned in the sheet protecting area 222 and other portions.

Meanwhile, as illustrated in FIG. 1, the floor body 100 for a vehicle according to various embodiments of the present invention further includes a central area 240 being the virtual area set in the shape extending in the length direction on the floor panel and set to pass through a point between the center side members 340 provided at both sides of a central portion of the floor panel and a tunnel area 242 being the virtual area set in the shape extending in the length direction on the floor panel and set to pass through a tunnel part 380 extending in the length direction of the vehicle from the central portion of the floor panel, in which the cross member 300 is formed so that a portion positioned in the central area 240 other than the tunnel area 242 may be thicker than that of a portion positioned in the tunnel area 242.

In detail, the central area 240 is set to pass through the point between the pair of center side members 340 provided at both sides of the floor panel. FIG. 1 illustrates an appearance that the central area 240 is set on the floor panel according to various embodiments of the present invention.

The central area 240 shares the shock dispersed and transferred from the reinforcing area 220 unlike the reinforcing area 220 which is the high strength area thickly molded to directly share the shock upon the side crashes, and therefore is more thinly molded than the reinforcing area 220. FIGS. 2 and 3 schematically illustrate the difference in thickness between the central area 240 and the reinforcing area 220.

Meanwhile, the tunnel area 242 is set to pass through the tunnel part 380 formed at the central portion of the floor panel. FIG. 1 illustrates an appearance that the tunnel area 242 is set on the floor panel according to various embodiments of the present invention.

The vehicle body is formed at the high strength to prevent a portion of the vehicle body from being damaged and deformed upon the side crashes of the vehicle, but a portion of the vehicle body needs to absorb and reduce the transferred shock to efficiently cope with the shock.

Therefore, in the central area 240, even the tunnel area 242 spaced apart from the sheet 400 on which a passenger is positioned is formed at a low strength and is set to absorb a shock generated upon the side crashes of the vehicle as strain energy.

Therefore, the cross member 300 is molded so that the portion positioned in the central areas 240 other than the tunnel area 242 is thicker than a portion positioned in the tunnel area and is also molded so that the portion positioned in the tunnel area 242 is relatively thinner to absorb the shock energy transferred to the vehicle body as the strain energy, thereby protecting passengers.

Meanwhile, as illustrated in FIG. 1, the floor body 100 for a vehicle according to various embodiments of the present invention further includes an inner mounting area 244 being the virtual area set in the shape extending in the length direction on the floor panel and set to pass through a point at which a sheet inner mounting 360 coupled with the lower portion of the sheet 400 of the vehicle between the center side member 340 and the tunnel part 380 is provided, in which the cross member 300 is formed so that a portion positioned in the inner mounting area 244 other than the tunnel area is thicker than that of a portion positioned in the central area 240 other than the inner mounting area 244.

In detail, the inner mounting area 244 is set to pass through a point at which the sheet inner mounting 360 of the pair of sheet mountings coupled with the lower portion of the sheet 400 is positioned and is set at a portion of the central area 240. FIG. 1 illustrates an appearance that the inner mounting is set on the floor body 100.

The sheet mounting serves to reinforce the cross member 300 upon the shock on the sides of the vehicle body and support the load of the passengers and the sheet 400, and when the cross member 300 at the point at which the sheet mounting is positioned does not reach the strength required to support the load of the passenger and the sheet 400, the deformation of the vehicle body such as the occurrence of the warpage phenomenon may occur.

Therefore, the inner mounting area 244 positioned in the central area 240 set at the low strength unlike the reinforcing area 220 supports the load of the passenger and the sheet 400 unlike the outer mounting area 224 to prevent the vehicle body from being deformed from the shock, such that the inner mounting area 244 has strength higher than cross member 300 of the central area 240.

Consequently, the cross member is molded so that the portion positioned in the inner mounting area 244 is thicker than the portion positioned in the central area 240 other than the inner mounting area 244 to protect the lower portion of the vehicle body of the passenger side, thereby improving the safety.

Meanwhile, as illustrated in FIG. 1, in the floor body 100 for a vehicle according to various embodiments of the present invention, the central portion of the side sill member 420 may be thicker than both ends 424 of the side sill member 420.

The side sill member 420 primarily shares the shock upon the side crashes of the vehicle while supporting the load of the vehicle body at both sides of the floor panel.

Upon the side crashes of the vehicle, a B pillar member sharing the shock along with the side sill member 420 is coupled with the central portion 422 of the side sill member 420 and thus extends in the height direction of the vehicle. The B pillar member collapses into an indoor space of the vehicle upon the side crashes and thus may injure passengers.

Therefore, the central portion 422 of the side sill member 420 is molded to be thicker than both ends 424 thereof to be formed at the high strength, thereby preventing the lower end of the B pillar member from invading into the interior space even upon the side crashes of the vehicle. Therefore, it is possible to efficiently improve the safety of the vehicle passengers without the special reinforcing member.

According to the floor body for a vehicle having the structure as described above, it is possible to promote the weight reduction of the vehicle body and efficiently improve the required safety upon the vehicle crashes.

In particular, by setting the virtual area set in the length direction of the vehicle depending on the crash contribution of the cross members forming the floor body of the vehicle upon the vehicle crashes, the portion corresponding to the area in which the crash contribution is high may be thickly molded and a portion of the cross member corresponding to the area in which the crash contribution is low may be thinly molded, such that unnecessary materials may be less consumed and the weight of the vehicle may be reduced, thereby promoting the weight reduction of the vehicle and improving the safety of the vehicle.

Further, the crash contribution may be analyzed in consideration of the position relation with other members and the role upon the vehicle crashes to effectively improve the safety of the vehicle and improve the economical efficiency.

For convenience in explanation and accurate definition in the appended claims, the terms "upper" or "lower", "inner" or "outer" and etc. are used to describe features of various embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A floor body for a vehicle, comprising:
    a floor panel forming a lower portion of the vehicle;
    first and second side sill members extending in a length direction of the vehicle and coupled to first and second sides of the floor panel, wherein the first side, a center portion, and the second side of the floor panel are positioned in series in a width direction of the vehicle;
    a first center side area being an area which extends in the length direction of the vehicle on the floor panel between the center portion and the first side and on which a first center side member extends in the length direction of the vehicle and a second center side area being an area which extends in the length direction of the vehicle on the floor panel between the center portion and the second side and on which a second center side member extends in the length direction of the vehicle;
    a cross member disposed on the floor panel and extending in the width direction of the vehicle to pass through the first and second center side areas and formed so that a portion of the cross member positioned outside the first and second center side areas is thicker than that of a portion of the cross member positioned between the first and second center side areas; and
    a central area being an area extending in the length direction of the vehicle on the floor panel and ranging between the first and second center side members in the width direction of the vehicle
    wherein the central area includes a tunnel area wherein the tunnel area is an area which extends in the length direction on the central portion of the floor panel between the first and second sides of the vehicle and on which a tunnel part extends in the length direction of the vehicle, and
    wherein the cross member passing through the tunnel part is formed so that a portion of the cross member positioned in the central area other than the tunnel area is thicker than that of a portion of the cross member positioned in the tunnel area.

2. The floor body for the vehicle of claim 1, further comprising:
    a first reinforcing area being an area extending in the length direction on the floor panel and disposed between the first center side member and the first side sill member; and
    a second reinforcing area being an area extending in the length direction on the floor panel and disposed between the second center side member and the second side sill member,
    wherein the cross member is formed so that a portion of the cross member positioned in the first and second reinforcing areas is thicker than that of a portion of the cross member positioned outside of the first and second reinforcing areas.

3. The floor body for the vehicle of claim 2, further comprising:
    a first outer mounting area being an area extending in the length direction on the floor panel and passing through a point at which a first sheet outer mounting coupled with a lower portion of a sheet of the vehicle between the first side sill member and the first center side member is provided; and
    a second outer mounting area being an area extending in the length direction on the floor panel and passing through a point at which a second sheet outer mounting coupled with a lower portion of the sheet of the vehicle between the second side sill member and the second center side member is provided,
    wherein the cross member is formed so that a portion of the cross member positioned in first and second reinforcing areas other than the first and second outer mounting areas is thicker than that of a portion of the cross member positioned in the first and second outer mounting areas.

4. The floor body for the vehicle of claim 3, further comprising:
    a first sheet protecting area being an area extending in the length direction on the floor panel and passing through a point between the first outer mounting area and the first center side area; and
    a second sheet protecting area being an area extending in the length direction on the floor panel and passing through a point between the second outer mounting area and the second center side area,
    wherein the cross member is formed so that a portion of the cross member positioned in the first and second sheet protecting areas is thicker than that of a portion positioned of the cross member outside of the first and second sheet protecting areas.

5. The floor body for the vehicle of claim 1, further comprising:
    a first inner mounting area being an area extending in the length direction on the floor panel and set to pass through a point at which a first sheet inner mounting coupled with the lower portion of the sheet of the vehicle between the first center side member and the tunnel part is provided; and
    a second inner mounting area being an area extending in the length direction on the floor panel and set to pass through a point at which a second sheet inner mounting coupled with the lower portion of the sheet of the vehicle between the second center side member and the tunnel part is provided, wherein the cross member is formed so that a portion of the cross member positioned in the first and second inner mounting areas other than the tunnel area is thicker than that of a portion of the cross member positioned in the central area other than the first and second inner mounting areas.

6. The floor body for the vehicle of claim 1, wherein a central portion of each of the first and second side sill members is thicker than that of both ends thereof.

* * * * *